Jan. 25, 1938.  A. L. BOEGEHOLD ET AL  2,106,590

BEARING AND METHOD

Filed April 29, 1935  2 Sheets-Sheet 1

Inventors
Alfred L. Boegehold &
Alfred W. Schluchter
By Blackmore, Spencer & Flint
Attorneys Jan. 25, 1938. A. L. BOEGEHOLD ET AL 2,106,590
BEARING AND METHOD
Filed April 29, 1935 2 Sheets-Sheet 2
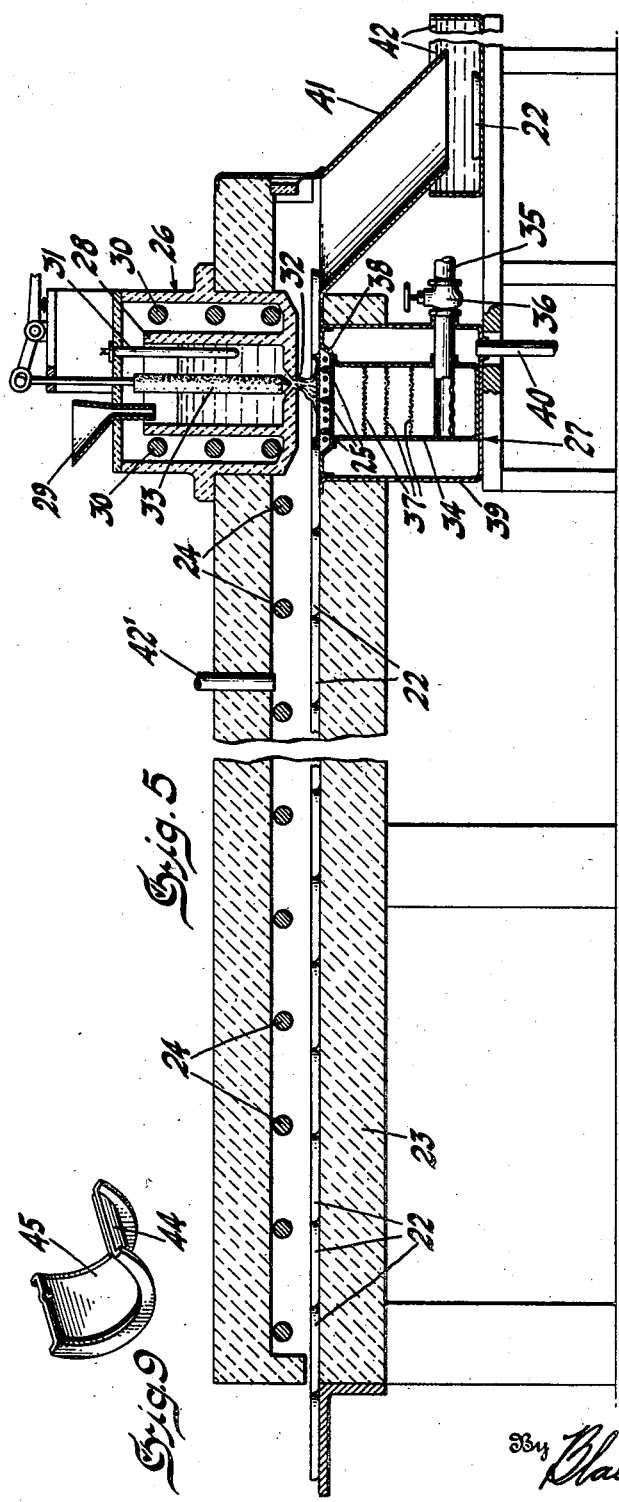
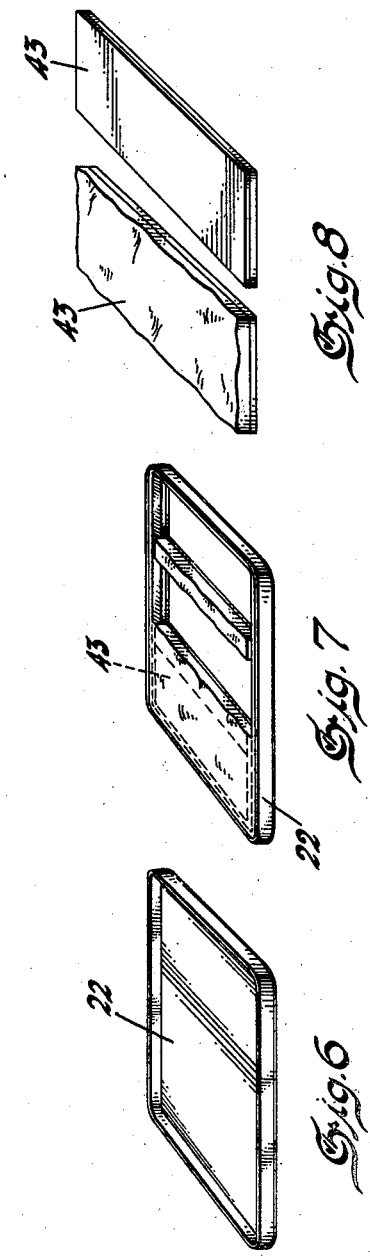
Inventors
Alfred L. Boegehold &
Alfred W. Schluchter
By Blackmore, Spencer & Flint
Attorneys Patented Jan. 25, 1938

2,106,590

UNITED STATES PATENT OFFICE 2,106,590

BEARING AND METHOD

Alfred L. Boegehold, Detroit, and Alfred W. Schluchter, Dearborn, Mich., assignors to General Motors Corporation, Detroit, Mich., a corporation of Delaware Application April 29, 1935, Serial No. 18,768

10 Claims. (Cl. 22—204)

Our invention relates to bearings wherein a plastic bronze wearing face is autogenously welded or fused to a supporting back made from a copper base material free from iron by method steps which include the heating of a supporting back of such material to a high temperature, supplying molten plastic bronze to said supporting back so as to form a layer in contact therewith, rapidly cooling the back and the molten plastic bronze to a temperature below that at which plastic bronze freezes, and forming a finished bearing from the supporting back and plastic bronze layer supplied thereto as aforesaid. The temperature of the back at the time when molten plastic bronze is supplied thereto being about the same as that of the molten plastic bronze the molecules of the two intermingle along the meeting surface between them, thus welding or fusing the two together and making of them in effect one single integral structure wherein the plastic bronze cannot become separated from the back. The intermingling of the molecules occurs immediately upon the molten plastic bronze coming into contact with the highly heated supporting back and the sudden cooling step is for the purpose of solidifying the copper content of the plastic bronze before the lead has had time to segregate therefrom, thus entrapping the lead in a solidified matrix of copper throughout which it is uniformly distributed.

By plastic bronze we mean a mixture or alloy made up of from 70% copper and 30% lead, to 50% copper and 50% lead, although small quantities of other metals may be present in the mixture; such plastic bronze being a well-known bearing material and one which has gone into extensive use particularly in airplane and automobile engines wherein the bearings are subjected to extremely severe service. The plastic bronze material itself, however, is quite plastic, and is deficient in strength, and when as is desirable it is used as an extremely thin bearing layer or facing upon a stronger copper base backing it has to be inseparably welded to the back in order that the bearing as a whole shall be of the strength required in the service for which it is designed. When in use the copper base material imparts the requisite strength to the bearing, and the bearing surface is provided by the thin plastic bronze layer welded to the back.

The invention herein is in the nature of an improvement in the inventions made by Norman H. Gilman, for Method of making bronze bearings, filed upon February 12, 1932, Serial Number 592,546, and by Alfred L. Boegehold, Alfred W. Schluchter, and Robin H. Terry, for Method of making bronze bearings, filed upon May 12, 1933, Serial Number 670,658; but differs therefrom, regarded in its broader aspect, in that in the inventions of said applications the molten plastic bronze is supplied to a highly heated supporting back made of iron or steel, whereas in this present invention a supporting back of copper or a copper base material is used; the preheating of the back, the supplying of molten plastic bronze thereto and the immediate sudden cooling of the back and plastic bronze to a temperature below the freezing temperature of the plastic bronze being substantially the same in this present invention as in the inventions to which said applications relate.

When molten plastic bronze which melts at a temperature around 1760° F., varying somewhat with the composition thereof, and which has to be further heated to the extent of around 150° F. to insure that it shall remain fluid during the pouring step, is poured into contact with highly heated iron or steel supporting backs, iron from the backs enters into solution with the plastic bronze and is present in the bearing layer wherein it is objectionable. In this present invention, therefore, the backs are made of copper, or of a material consisting for the most part of copper; so that no iron will be present in the plastic bronze layer which forms the bearing surface.

Our invention regarded as a method or process is independent of any particular apparatus so long as apparatus suitable for heating the supporting backs, for melting the plastic bronze, for supplying it to the backs, and for suddenly cooling the backs and the molten plastic bronze while they are in contact with one another to a temperature below that at which the plastic bronze freezes, is employed. We have, however, and in order to enable our invention to be the better understood, illustrated in the accompanying drawings various devices suitable for use in performing the method wherein our invention consists; and inasmuch as the bearings are so related to the method whereby they are produced that neither can be conceived of separate and apart from the other, we regard our invention as comprehending both the bearings themselves and the method whereby they are produced, and have so claimed our invention in the concluding claims.

In the drawings:

Figure 5 is a view showing a section upon a vertical longitudinally extending plane of a furnace and accessory devices suitable for use in the making of bearings, when shallow pans or trays are used in place of annular mold parts as in Figures 1 to 4.

Figure 6 is a perspective view showing a copper or copper base material pan made use of when the furnace shown in Figure 5 is used.

Figure 7 is a view showing how flat bearing strips are punched from a pan having a layer of plastic bronze welded or fused to its bottom wall, and from which strips finished bearings are formed.

Figure 8 is a perspective view showing a bearing strip as it is punched from a pan bottom, and also after surplus plastic bronze has been removed, as by a broaching operation, to provide a smooth layer thereof of uniform thickness.

Figure 9 is a perspective view showing a finished bearing member made from a bearing strip such as is shown in Figure 8.

Figures 1 to 4 are in the nature of schematic views illustrating the making of bearings in accordance with our invention but wherein the operations contemplated are for the most part manual, and the rate of production is relatively slow; whereas Figures 5 to 9 illustrate apparatus better adapted for large production although the essential steps involved in the production of the bearings are the same as those involved in Figures 1 to 4. Referring first to Figures 1 to 4, the numeral 10 designates an annular shell which forms the supporting back of the finished bearing, and which is made of copper or a copper base material as hereinbefore explained; among which materials are pure or substantially pure copper, copper-silicon alloys, copper-nickel alloys, and copper-zinc alloys, the amount of metal other than copper being small in all cases. A copper 95% zinc 5% alloy is the preferred copper base material irrespective of whether bearings are made in accordance with Figures 1 to 4, or in accordance with Figures 5 to 9, or however they may be made within the scope of our invention; and the material other than copper, when present, is used to impart additional strength and rigidity to the supporting back to which the bearing layer of plastic bronze is welded or fused as hereinbefore explained.

Figure 1:
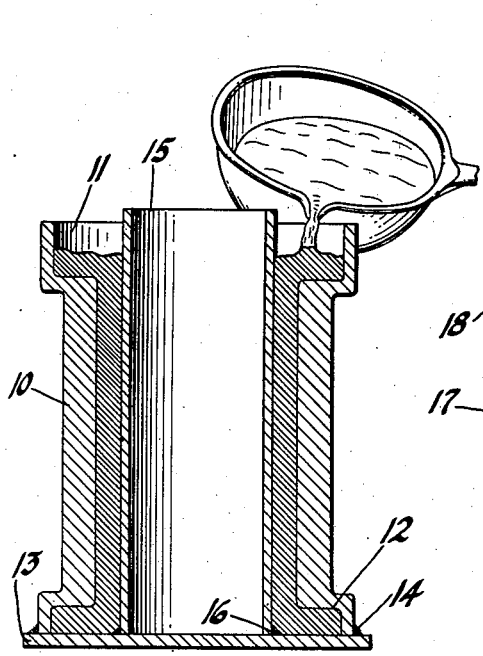
Figure 1 is a view showing a section upon a vertical central plane, of a mold used in the making of a bearing in accordance with our invention.

The shell 10 is shown as having enlarged recesses 11, 12 at its upper and lower ends to provide end thrust flanges in the bearing produced; and the lower end of said shell is closed by a plate 13 welded thereto as at 14, and which plate is preferably (although not necessarily) made of the same copper base material. Within the shell is a tube 15 the lower end of which is welded to the plate 13 at 16 whereby an annular space is provided within the shell and surrounding the tube and into which molten plastic bronze is poured from a suitable ladle, as illustrated in Figure 1.

The mold assembly made up of the shell 10, the bottom plate 13 and the tube 15 is first heated (in any suitable furnace, not shown) to a high temperature, by which we mean to a temperature around 1700° to 1800° F. The temperature is not critical and may be varied throughout a considerable range so long as the temperature attained is sufficiently below the melting temperature of the copper base material used to avoid the melting thereof during the heating, prior to the pouring of molten plastic bronze into the annular mold space, as well also as to avoid melting of the mold when the more highly heated molten plastic bronze is poured into the annular mold space thereof, as illustrated in Figure 1; and as the heating of the mold and the pouring of molten plastic bronze into the annular space therein are assumed to occur under conditions such that oxidization may occur to some extent, a suitable flux is placed in said annular space and melted therein during the heating, which flux is displaced by the molten plastic bronze as it is poured into said annular space as next appears.

Figure 2:
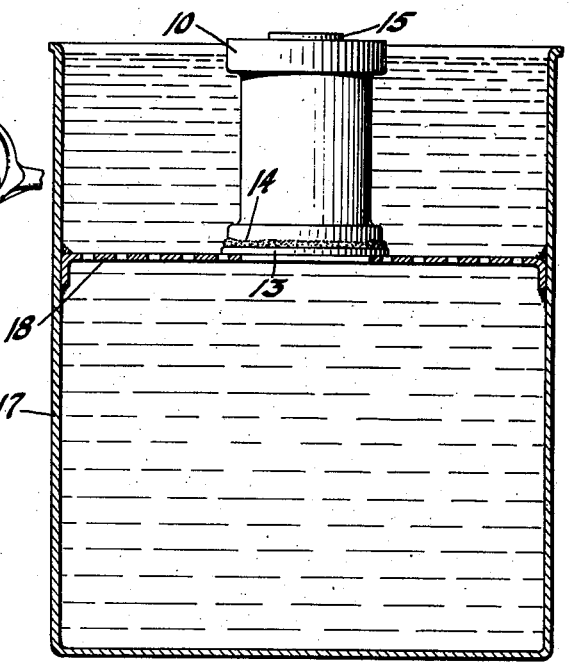
Figure 2 is a view illustrating the sudden cooling step of our process.

The pouring of the molten plastic bronze into the annular mold space and into contact with the inner surface of the highly heated shell or backing results in an intermingling of molecules of the copper base material of the shell and the copper of the plastic bronze, and in the formation of a welded or fused joint or bond between the supporting back and the plastic bronze supplied to said annular space; and as soon as is conveniently possible after such pouring the mold is transferred (as by suitable tongs) to a tank 17 containing water and wherein there is a grating 18 upon which the mold rests, the same being submerged in the water to near its upper end as shown in Figure 2. The mold and the molten plastic bronze are during this step of our method suddenly cooled from a temperature around that of the molten plastic bronze to a temperature below the freezing temperature thereof; with the result that lead is forced away from the bonding surface as the cooling progresses inward from the outside of the shell or backing 10 (access of water to the interior of the tube 15 being prevented by the bottom plate 13), the copper of the plastic bronze becomes solid in advance of the lead, and the lead of the plastic bronze is grasped by the resulting matrix of solidified copper before it can segregate therefrom and is held in a molecular or finely divided condition uniformly distributed throughout the plastic bronze.

Figure 3:
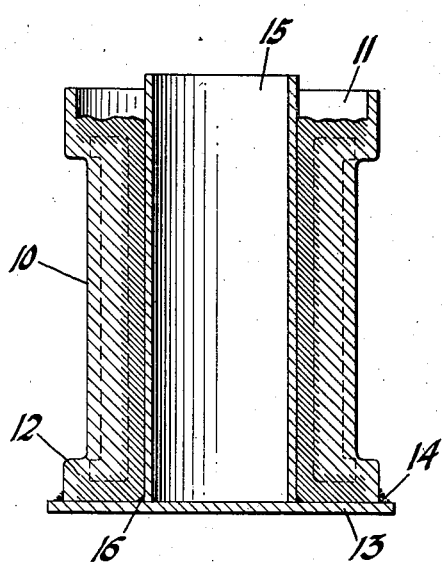
Figure 3 is a view similar to Figure 1 showing the mold after it has been filled with molten plastic bronze and cooled, and illustrating how a finished bearing is formed therefrom.
Figure 4:
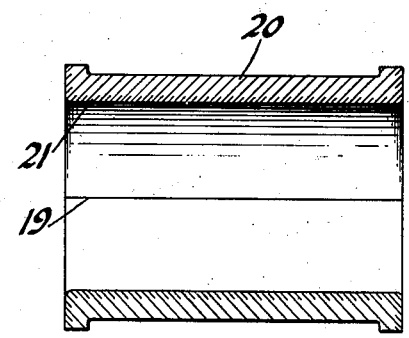
Figure 4 is a view showing a finished bearing made in accordance with our invention.

After the mold and plastic bronze have been cooled as aforesaid the bottom plate 13 and tube 15 are removed by suitable machining operations, and the exterior of the shell and the interior of the plastic bronze lining are finished by like operations to produce a finished bearing of about the dimensions indicated by dotted lines in Figure 3. The resulting bearing is as will be appreciated of tubular form, as indicated in Figure 4; and the same may be used as a single piece tubular bushing or, as is more commonly the case, the bushing may be split longitudinally, as indicated at 19, to provide two semi-cylindrical bearing members or half bearings. In the finished bearing the copper base material backing 20 provides the requisite strength, while the inner plastic bronze layer 21 provides the bearing surface; this layer being welded or fused to the back and being extremely thin (ordinarily $\frac{1}{32}$ of an inch or less in thickness) so that it has no strength apart from the back to which it is fused and of which it forms in effect an integral part.

Referring now to Figures 5 to 9, wherein the supporting back is in the form of a piece of metal cut from the bottom wall of a shallow pan or tray, the numeral 22 designates a series of such shallow pans made of copper or copper base sheet material free from iron by suitable blanking, pressing and shaping operations, whereby the side edges are turned up as shown, the copper base material being of the same composition as hereinbefore described. This sheet material used may be around $\frac{1}{8}$ of an inch in thickness, and the plastic bronze layer or bearing facing is preferably around $\frac{1}{32}$ of an inch or less in thickness in the finished bearing.

The pans 22 are pushed or otherwise advanced through a furnace 23 which as shown is preferably heated by resistance heaters 24, although the method of heating is immaterial; and they are heated gradually as they traverse the furnace and attain a final high temperature around the temperature at which plastic bronze melts. The advancing or right-hand pan at the end of its travel through the furnace is pushed onto and rests upon supports 25 beneath a molten plastic bronze supplying device 26, and occupies a position above a cooling device 27 hereinafter described.

The molten plastic bronze supplying means 26 as shown includes an internal receptacle 28 to which molten plastic bronze is supplied through a funnel 29, the receptacle being heated electrically as by a resistance heater 30 and the temperature therein being indicated by a thermocouple 31. The receptacle 28 has an opening 32 in its bottom which is controlled by a valve 33 which, when lifted, permits molten plastic bronze to flow into the pan or tray which is located beneath said opening and which rests upon the supports 25; this being the pouring step to which we have hereinbefore referred although the particular manner in which the molten plastic bronze is supplied to the pans is of secondary importance in our invention. That is, Figure 1 illustrates one way of supplying molten plastic bronze to a supporting back, and Figure 5 another, and other methods of supplying molten plastic bronze to supporting backs may be used.

After molten plastic bronze has been supplied to a pan and before it has had time to become solid, that is while the plastic bronze remains in a liquid condition, the highly heated pan and the molten plastic bronze therein are cooled as quickly as possible to a temperature below that at which the plastic bronze freezes by the cooling device 27 which may be of various forms, but which is shown as comprising an internal casing 34 to which water is supplied through a pipe 35 by opening a valve 36 therein when a pan is to be cooled, and which casing has internal screens 37 to break up eddy currents and secure a uniform up-flow of water therethrough. The water flows through holes in a plate 38 which carries the supports 25 and at the end of its up-flow contacts with the bottom of the pan, thus suddenly cooling it and freezing the molten plastic bronze therein, which water overflows into the external casing 39 of the cooling device and flows out therefrom through a waste pipe 40. After the cooling step the pan which now has a layer of plastic bronze inseparably united with its bottom wall is pushed forward and off the supports 25, and slides down a chute 41 into a water containing tank 42. The movement of the pans along and through the furnace is by a step-by-step movement as each successive pan has of necessity to pause and remain at rest upon the supports 25 while molten plastic bronze is supplied to it, and while the pan and the molten plastic bronze therein are suddenly cooled as hereinbefore explained.

Molten plastic bronze when supplied to a highly heated copper base material pan or backing flows and becomes distributed over the surface thereof more freely and uniformly than over an iron or steel material, and becomes bonded thereto at a lower temperature than is required to secure proper bonding when the supporting backing of the bearing herein contemplated is of iron or steel; from which it follows that our invention does not require as high a furnace temperature as is required when iron or steel pans or equivalent supporting backing members are used as the bonding action is dependent both upon the temperature of the pan or back, and upon the material from which the same is made. Such a copper base material as is herein recommended (copper 95%, zinc 5%) melts at a temperature around 1950° F.; and as a matter of course the heating of the pans must not be to their melting temperature nor to a temperature which will excessively soften them. Therefore and because distribution of the plastic bronze over the pan bottoms, and satisfactory bonding, occurs in our invention at a lower temperature than is necessary to secure those results when iron or steel pans are used, we are able to use a lower furnace temperature than has heretofore been regarded as necessary. As a matter of fact we have secured satisfactory bonding with a temperature in the furnace 23 as low as 1500° F. which, although obviously a high temperature and one around that at which plastic bronze melts, is nevertheless around 250° F. below the melting temperature of plastic bronze. Thus and although the furnace temperature as stated is not critical, there are obvious advantages in operating with as low a temperature as will produce satisfactory bearings; and we recommend that in practicing our invention such furnace temperature shall be below the temperature at which plastic bronze melts.

The immediate effect of the supplying of molten plastic bronze to a highly heated pan as hereinbefore explained is that there is an intermingling of the molecules of the material of the pan, and of the copper content of the plastic bronze, along the surface of contact between the two, thus establishing an autogenous weld between the two and fusing them together so as to make them in effect one single structure. Then and due to the sudden cooling the lead is trapped in a matrix of copper, which solidifies in advance of the lead, and the molecules of the lead are held in a finely divided condition uniformly distributed throughout the plastic bronze bearing layer of the finished bearing; and obviously and because there is no iron in the material of the pan, no iron can be present in the bearing layer of the finished bearing.

A non-oxidizing or reducing gas such, for example, as nitrogen or carbon monoxide or other gas which is neutral and will have no oxidizing action upon the heated pans or upon the molten plastic bronze supplied to them, is supplied to the interior of the furnace 23 through a pipe 42' discharging thereinto; the rate of supply of such gas being sufficient to keep the furnace full, and to cause a slight and slow outflow thereof through the inlet opening through which the pans are fed into the furnace. The purpose of this gas is to prevent the formation of copper oxide, which will occur if the atmosphere inside the furnace contains free oxygen, upon the highly heated pans or upon the surface or within the mass of molten plastic bronze supplied to the pans. Copper oxide upon the pan bottoms interferes with the formation of a perfect bond between them and the molten plastic bronze, and with the welding or fusing of the two together; and copper oxide, being an extremely hard and gritty material, if present in the plastic bronze bearing layers of the bearings produced results in scoring or grooving or otherwise injuring the crank pins or bearing journals of the crank shaft of the engine when the bearings are in use. Such injury, however, as well also as possible imperfect bonding along the meeting surface between the molten plastic bronze and the copper base material of the pan bottoms is avoided when, as in our invention, the formation of copper oxide is prevented by keeping the furnace full of a gas which will have no oxidizing effect upon the pans nor upon the molten plastic bronze supplied to them. The formation of lead oxide is also prevented as will be appreciated; but lead oxide, even if present in the plastic bronze bearing layer, will do little or no harm because it is a soft and amorphous substance and is lacking in the abrasive qualities inherent in copper oxide.

The gas supplied to the interior of the furnace acts to prevent the formation of copper oxide upon the copper base material of the pans, and acts also when as preferred said gas is a reducing gas to convert such small quantities of oxides as may sometimes be present into their respective metals. Various kinds of gases may be used but use of gases which may be absorbed by molten plastic bronze should be avoided, because their rejection or exclusion therefrom as the plastic bronze solidifies is likely to result in porosity of the bearing facing, which is objectionable. Hydrogen, for example, is satisfactory so far as concerns its reducing action; but it is likely to be absorbed by the molten plastic bronze, and rejected during freezing thereof, thus resulting in an objectionable porous condition in the facing of the bearing.

In order, therefore, to produce a dense bearing layer free from porosity the non-oxidizing or reducing gas should be one which will not be absorbed by the molten plastic bronze to any substantial extent. We have found as the result of extensive experimentation that carbon monoxide is a suitable gas to use in the making of bearings in accordance with our invention, as it prevents the formation of oxides and is not dissolved by the molten plastic bronze to any appreciable degree. A mixture of carbon monoxide, carbon dioxide, and a small quantity of hydrogen has also been found to give satisfactory results, although the amount of hydrogen therein should be kept below a certain upper limit, which is around 15%, as its presence tends to cause porosity in the bearing facing. Carbon dioxide when present should be to an extent insufficient to make the atmosphere inside the furnace oxidizing.

A reducing gas within the furnace acts to exclude oxygen of the surrounding atmosphere and at the same time to reduce such small quantities of oxides as may be present. Our invention, however, in its broader aspect contemplates the heating and the sudden cooling of the pans and plastic bronze in them under conditions such that oxidation cannot occur; and while as explained that end is preferably attained by keeping the furnace full of a reducing gas the same result, so far as the preventing of the formation of oxides is concerned, may be attained by keeping the furnace full of an inert gas having little or no reducing action. Thus nitrogen may be used in place of the reducing gases mentioned to provide an oxygen free atmosphere within the furnace which gas, while it has no reducing action, acts nevertheless to prevent oxidation of the pans and of the copper of the plastic bronze. When, therefore, nitrogen is used the pans should be coated with a suitable flux before being introduced into the furnace as they ordinarily have an appreciable coating of copper oxide upon them which would prevent proper bonding along the joints between the pan bottoms and the plastic bronze layers and which oxide layer will be removed by the flux.

Thus if nitrogen is used a flux is commonly used to remove copper oxide from the pans, and further oxidation is prevented by the exclusion of oxygen from them by the nitrogen during their passage through the furnace. We prefer, however, to avoid the use of a flux which result is attained by the use of a reducing gas within the furnace as hereinbefore explained. When a reducing gas is used no flux is necessary, for the gas not only excludes oxygen from the pans and the plastic bronze during the pouring step but acts further to reduce such residual oxides as may have been present initially to their metals.

After the pans have been supplied with a layer of solidified plastic bronze as hereinbefore explained bearing strips 43 (one of which as punched from a pan bottom, and after its rough upper surface has been smoothed by the removal of excess plastic bronze, is shown in Figure 8) are punched out from the bottom walls of the pans as indicated in Figure 7; from which smoothed strips half bearings semi-circular in form are made by subjecting them to various finishing and bending operations which finishing steps, however, are not involved in this present application. Finished bearings may be formed from such bearing strips in accordance with the teaching of the second of the applications for patent hereinbefore referred to, or in other ways which form the subject matter of other applications for patent relating specifically to the formation of finished bearings from bearing strips such as are shown in Figure 8. Figure 9 shows one form of finished bearing made in accordance with our invention and wherein the numeral 44 designates a supporting back of copper base alloy, and 45 a plastic bronze bearing layer or facing which is fused or welded to the back so as to be inseparable therefrom, whereby the back and wearing face are in effect a single integral structure.

Having thus described and explained our invention we claim and desire to secure by Letters Patent:

1. The method of making a bearing which consists in providing a supporting back made from a copper base material free from iron; heating said supporting back to a temperature around the temperature at which plastic bronze melts; supplying molten plastic bronze to said supporting back; applying a cooling liquid to said back to thereby cool the same and said liquid plastic bronze rapidly from a temperature above the freezing temperature of said plastic bronze to a temperature below said freezing temperature; and forming a finished bearing from said supporting back and plastic bronze.

2. The method of making a bearing which consists in providing a shallow pan made from a sheet of copper base material free from iron; heating said pan to a temperature around the temperature at which plastic bronze melts; supplying molten plastic bronze to said pan; supplying a cooling liquid to the exposed bottom of said pan to thereby cool the same and the liquid plastic bronze contained therein rapidly from a temperature above the freezing temperature of said plastic bronze to a temperature below said freezing temperature; forming a bearing strip from the bottom wall of said pan; and forming a finished bearing from said bearing strip.

3. In a method for making bearings, the steps which consist in providing a shallow pan made from a sheet of copper base material free from iron; heating said pan to a temperature around the temperature at which plastic bronze melts; supplying molten plastic bronze to said pan; and supplying a cooling liquid to the exposed bottom of said pan to thereby cool the same and the liquid plastic bronze contained therein rapidly from a temperature above the freezing temperature of said plastic bronze to a temperature below said freezing temperature.

4. In a method for making bearings, the steps which consist in providing a shallow pan made from a sheet of copper base material free from iron; heating said pan to a temperature around but lower than the temperature at which plastic bronze melts; supplying molten plastic bronze to said pan; and supplying a cooling liquid to the bottom of said pan to thereby cool the same and the liquid plastic bronze contained therein rapidly from a temperature above the freezing temperature of said plastic bronze to a temperature below said freezing temperature.

5. The method of making a bearing defined in claim 1 and wherein the copper base material of the supporting back is composed of approximately 95% of copper, and approximately 5% of zinc.

6. The method of making a bearing defined in claim 2 and wherein the copper base material of the pan is composed of approximately 95% of copper, and approximately 5% of zinc.

7. In a method for making bearings, the steps which consist in providing a shallow pan made from a sheet of copper base material free from iron; heating said pan in a non-oxidizing or reducing atmosphere to a temperature corresponding approximately with that at which plastic bronze melts; supplying molten plastic bronze to said pan; and supplying a cooling liquid to the exposed bottom of said pan to thereby cool the same and the liquid plastic bronze contained therein rapidly from a temperature above the freezing temperature of said plastic bronze to a temperature below said freezing temperature.

8. As an article of manufacture for use in making a bearing, a shallow pan made from a sheet of copper base material free from iron and having a layer of plastic bronze upon its bottom wall, and which layer is fused to said bottom wall so as to be inseparable therefrom.

9. A bearing strip formed from the bottom wall of a shallow pan made from a sheet of copper base material free from iron and having a layer of plastic bronze fused thereto so as to be inseparable therefrom.

10. A bearing member having a supporting back made from a copper base material free from iron, and a wearing layer or facing of plastic bronze welded or fused to said back so as to be inseparable therefrom.

ALFRED L. BOEGEHOLD.
ALFRED W. SCHLUCHTER.